(12) United States Patent
Oskar

(10) Patent No.: US 10,370,064 B2
(45) Date of Patent: Aug. 6, 2019

(54) MARINE SURFACE VESSEL

(71) Applicant: ROLLS-ROYCE MARINE AS, Ålesund (NO)

(72) Inventor: Levander Oskar, Pargas (FI)

(73) Assignee: ROLLS-ROYCE MARINE AS, Ålesund (NO)

( * ) Notice: Subject to any disclaimer, the term of this patent is extended or adjusted under 35 U.S.C. 154(b) by 0 days.

(21) Appl. No.: 15/764,151

(22) PCT Filed: Oct. 6, 2016

(86) PCT No.: PCT/EP2016/073841
§ 371 (c)(1),
(2) Date: Mar. 28, 2018

(87) PCT Pub. No.: WO2017/060331
PCT Pub. Date: Apr. 13, 2017

(65) Prior Publication Data
US 2018/0281901 A1 Oct. 4, 2018

(30) Foreign Application Priority Data

Oct. 7, 2015 (FI) ...................................... 20155704

(51) Int. Cl.
*B63B 17/00* (2006.01)
*B63H 21/32* (2006.01)
(Continued)

(52) U.S. Cl.
CPC ...... *B63B 17/0027* (2013.01); *B63B 17/0036* (2013.01); *B63B 35/00* (2013.01);
(Continued)

(58) Field of Classification Search
CPC . B63B 17/0027; B63B 35/00; B63B 17/0036; B63B 2035/004; F02M 21/029;
(Continued)

(56) References Cited

U.S. PATENT DOCUMENTS 6,237,347 B1 5/2001 Rigby
8,738,368 B2 * 5/2014 Gratke ................... G10L 21/02
381/92

(Continued)

FOREIGN PATENT DOCUMENTS

EP 2029421 5/2007
GB 2481983 1/2012
JP 02109792 4/1990

OTHER PUBLICATIONS

International Search Report issued in PCT/EP2016/073841 dated Nov. 1, 2017, pp. 1-3.
(Continued)

*Primary Examiner* — Anthony D Wiest
(74) *Attorney, Agent, or Firm* — Jeffrey S. Melcher; Melcher Patent Law PLLC

(57) ABSTRACT

The invention relates to a marine surface vessel (1), in particular a passenger ship, extending in a longitudinal direction between a bow (2) and a stern (3), comprising —least one power providing apparatus (6) operatively connected to at least one propulsion unit (7) for propulsion of the vessel, —a fuel tank arrangement (8) for storing gaseous fuel in a liquid phase, connected to the power providing apparatus (6) by means of a gas supply system for running the power providing apparatus (6), and —a plurality of decks (91-98) distributed vertically, one above the other, —the fuel tank arrangement (8) comprising two tank sub-arrangements (81, 82), each tank sub-arrangement comprising at least one gaseous fuel tank (811, 812, 821, 822), each fuel tank extending vertically past at least two of the decks (92-95), and at least two of the decks (92-95), past which the fuel tanks (811, 812, 821, 822) extend, each presents a passageway (941) extending between the tank sub-arrangements (81, 82).

17 Claims, 2 Drawing Sheets

(51) Int. Cl.
*F02M 21/02* (2006.01)
*B63H 21/14* (2006.01)
*B63H 21/38* (2006.01)
*B63B 35/00* (2006.01)

(52) U.S. Cl.
CPC ............ *B63H 21/14* (2013.01); *B63H 21/32* (2013.01); *B63H 21/38* (2013.01); *F02M 21/029* (2013.01); *F02M 21/0221* (2013.01); *F02M 21/0293* (2013.01); *B63B 2035/004* (2013.01); *Y02T 10/32* (2013.01); *Y02T 10/36* (2013.01); *Y02T 70/5218* (2013.01)

(58) Field of Classification Search
CPC ........... F02M 21/0293; F02M 21/0221; B63H 21/14; B63H 21/38; B63H 21/32; Y02T 10/32; Y02T 70/5218; Y02T 10/36
See application file for complete search history.

(56) References Cited

U.S. PATENT DOCUMENTS

| | | | | |
|---|---|---|---|---|
| 8,834,218 B2 * | 9/2014 | Lee | .......................... | B63B 25/16 114/74 A |
| 2009/0253318 A1 * | 10/2009 | Hannula | .................. | B63B 25/16 440/88 F |
| 2012/0238161 A1 * | 9/2012 | Lee | .......................... | B63B 25/16 440/88 F |

OTHER PUBLICATIONS

IPER and Written Opinion issued in PCT/EP2016/073841 dated Nov. 17, 2017, pp. 1-28.

* cited by examiner

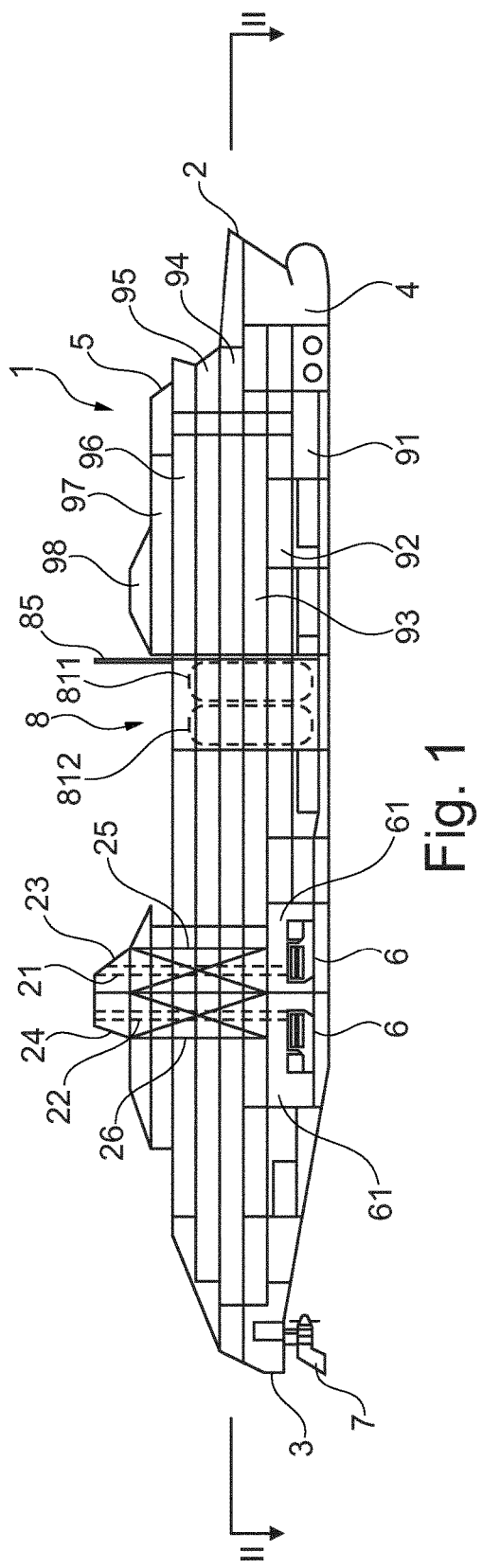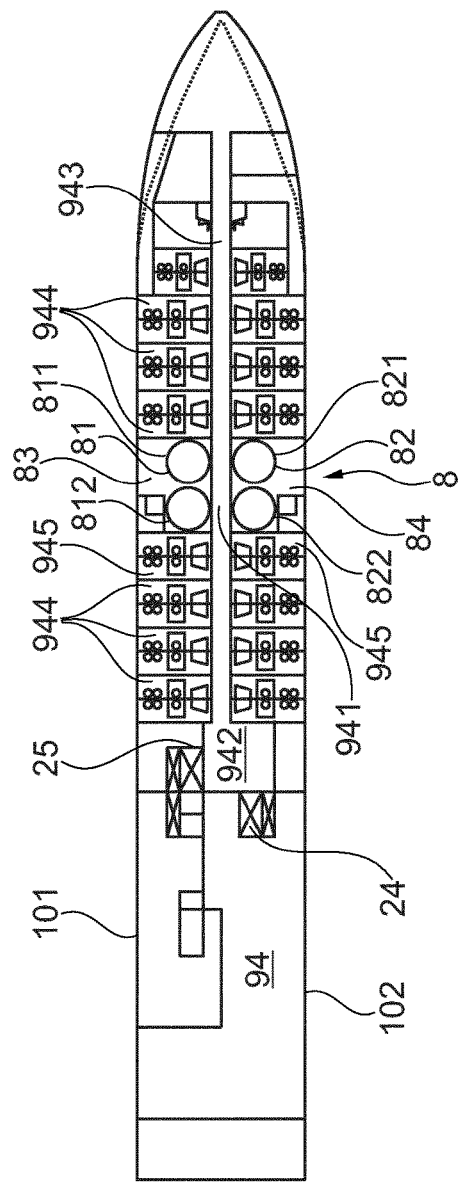

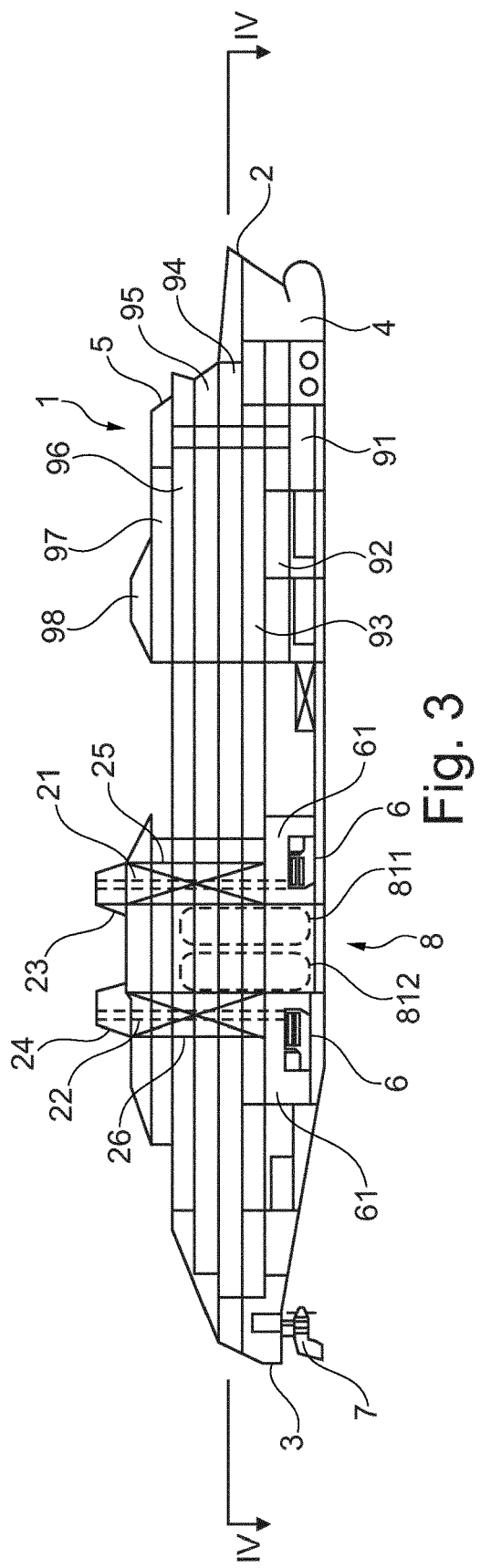

MARINE SURFACE VESSEL

TECHNICAL FIELD

The invention relates to a marine surface vessel, in particular a passenger ship, extending in a longitudinal direction between a bow and a stern, comprising least one power providing apparatus operatively connected to at least one propulsion unit for propulsion of the vessel, and a fuel tank arrangement for storing gaseous fuel in a liquid phase, connected to the power providing apparatus by means of a gas supply system for running the power providing apparatus.

BACKGROUND

There is a desire to use gaseous fuel in marine vessels due to its combustion being cleaner than that of heavy fuel oil or marine diesel oil, and also since nowadays it can be more available than said traditional fuel types. It is known to use in LNG (liquid natural gas) cargo ships, fuel from the cargo tanks for the ship's propulsion, e.g. from U.S. Pat. No. 6,237,347B1 and JPH02109792A. Also passenger and vehicle transporting vessels with LNG based propulsion have been produced.

LNG is typically stored at a temperature of about minus 162° C. in pressure vessels. Such LNG vessels, or tanks, are larger in size and heavier than diesel oil tanks, e.g. due to the temperature insulation of the tanks. A good utilisation of space is critical in modern vessel design, not least due to economic interests of maximising the space for "payload", for example space on car decks of RoRo-vessels, or space for cabins, restaurants, etc, in cruise ships. Therefore, positioning of large and heavy LNG fuel tanks poses a problem since they tend to reduce the space available in the vessel.

Also, in view of the hazardous nature of LNG, the positioning of the tanks has to be such that they are protecting, e.g. in that case of a collision or grounding of the vessel.

EP2029421B1 suggests an LNG fuel tank arrangement in a marine vessel, which has a vertically elongated shape, and which is in the vicinity and aligned with a vertical casing for the vessel engine exhaust pipe, (exhaust stack). The fuel tank arrangement comprises a number of tubular tanks which are interconnected with each other. Both the exhaust stack and the fuel tank arrangement are located centrally in the ship, on the ship's centreline.

The vertical tank arrangement may provide some saving of deck space, e.g. on a car deck. Also the location of the vessel's centreline, at a maximal distance from the ship's sides, reduces the risk of tank damage in case of a collision or grounding of the ship.

However, the location of the tank arrangement as suggested in EP2029421B1 will, in particular in passenger ships such as cruise ships, limit possibilities to provide a ship interior that is functional and which facilitates undertakings on the ship, requiring quick movement of crew and easy transport of items, such as luggage, food, equipment, etc.

SUMMARY

It is an object of the invention to provide a marine surface vessel propelled with gaseous fuel, which facilitates on-board functions on the vessel, while providing safety margins required by the gaseous fuel hazard.

It is also an object of the invention to provide a marine surface vessel propelled with gaseous fuel, which facilitates on-board functions on the vessel and provides large desk spaces, while providing safety margins required by the gaseous fuel hazard.

These objects are reached with marine surface vessel, in particular a passenger ship, extending in a longitudinal direction between a bow and a stern, comprising
- least one power providing apparatus operatively connected to at least one propulsion unit for propulsion of the vessel,
- a fuel tank arrangement for storing gaseous fuel in a liquid phase, connected to the power providing apparatus by means of a gas supply system for running the power providing apparatus, and
- a plurality of decks distributed vertically, one above the other,
- the fuel tank arrangement comprising two tank sub-arrangements, each tank sub-arrangement comprising at least one gaseous fuel tank, each fuel tank extending vertically past at least two of the decks, and at least two of the decks, past which the fuel tanks extend, each presenting a passageway extending between the tank sub-arrangements.

It should be noted that the power providing apparatus could be any kind of suitable the power providing apparatus, e.g. an internal combustion engine, or a fuel cell and electric motor combination. Also, the vessel could be provided with one, two, three, or more power providing apparatuses.

Each passageway is preferably suitable for movement of persons, e.g. crew and/or passengers, and/or items, e.g. luggage, food, interior details, supplies and/or equipment. The passageways extend between the fuel tanks of the tank sub-arrangements.

Herein, a fuel tank extending vertically past a deck means that it extends past the supporting structure of the deck as well as past the space provided between the supporting structure of the deck and the supporting structure of the superior deck. The bottom of each fuel tank is preferably below the passageways of the at least two decks and the top of each fuel tank is preferably above the passageways of the at least two decks.

Thus, the invention provides a division of the fuel tank arrangement into tank sub-arrangements, and provides on the decks a passageway between the tank sub-arrangements. Thereby the fuel tanks can be vertically orientated, saving deck space in the vessel, e.g. on a car deck, while at the same time on-board functions, such as movement of crew and items, are facilitated. More specifically, by separating the tank sub-arrangements to allow passageways between them, the movements of persons and items centrally in the vessel can be allowed, which may keep the distances for such movements relatively short. Keeping movement distances short will decrease time for transportation of each person or item, and this can increase the rate of transportations which facilitates the on-board activities.

In addition, the on-board functions facilitation is provided while at the same time allowing a safe distance between the fuel tanks and the sides of the vessel. More particularly, the tank sub-arrangements can be provided with a reduced width compared to that of an integrated fuel tank arrangement, and this allows for positioning the tank sub-arrangements offset from the centreline of the ship, without reaching too close to the ship sides, so as for the safety margin, required by the gaseous fuel hazard, to not be compromised.

It should be noted that there could be more than two tank sub-arrangements, distributed on opposite sides of the passageways. In general, there could be one, two, three or more tank sub-arrangements on each side of the passageways.

Preferably, each of said passageways is a central passageway by extending in the longitudinal direction of the vessel, and being located centrally in a lateral and horizontal direction of the vessel. This will increase possibilities of providing facilitation of the on-board activities of the vessel.

Preferably, each of said passageways extends in the longitudinal direction of the vessel, from a portion of the respective deck aft of the tank sub-arrangements to a portion of the respective deck forward of the tank sub-arrangements. Preferably, each of said passageways is adapted so as to provide for persons and/or items to move or be moved through the respective passageway.

Preferably, at least one of the at least two the decks presenting a passageway extending between the tank sub-arrangements, presents a plurality of cabins distributed on both sides of the passageway, at least some of the cabins extending from the passageway to a respective side of the vessel. This can provide an advantageous arrangement where the vessel is a passenger vessel, and the passageway is provided in the form of a central corridor surrounded by cabins. The cabins extending from the passageway to a respective side of the vessel allows the provision of a view to the outside for passengers, and possibly a balcony at the vessel sides in connection with the cabins. In addition, since the passageway extends between the tank sub-arrangements, an advantageous layout can be provided, allowing passengers to easily move within the deck, e.g. in the longitudinal direction of the vessel. Thus, through a combination of vertically orientated fuel tanks with a passageway between them, and an arrangement of cabins allowing passengers direct access to a vessel side and to the passageway, deck space savings, fast and easy access to different locations on the deck via the passageway, as well as pleasure and convenience for the passengers, may be provided.

Where the tank sub-arrangements are located in respective tank compartments, at least one of the cabins may be located adjacent to a tank compartment. Any space between the tank sub-arrangements and the respective side of the vessel may be used partly or fully for cabins. At least one of the cabins may extend from the passageway towards the respective side of the vessel, and into the space between the respective tank sub-arrangement and the respective side of the vessel.

Preferably, each tank sub-arrangement comprises at least two fuel tanks distributed in the longitudinal direction of the vessel. This will further keep the width of the tank sub-arrangements relatively small so that the distance from the fuel tanks to the vessel sides can be relatively large, such as for the safety margin, required by the gaseous fuel hazard, to not be compromised.

Preferably, the tank sub-arrangements are at the same longitudinal position in the vessel. This will facilitate the provision of any shared arrangements of the tank sub-arrangements, such as compartments for the gas supply system for running the power providing apparatus, as well as service and repair activities related to the tank sub-arrangements.

Preferably, each tank sub-arrangement has a vertical extension which is larger than any of its horizontal extensions. Thus, each tank sub-arrangement has a vertically elongated shape, which means that it has a vertical extension which is larger than its extension in the vessel longitudinal direction or the vessel lateral and horizontal direction. This will further contribute to saving deck space in the vessel.

Preferably, where the vessel presents a hull and a superstructure above the hull, a lower portion of each fuel tank is located in the hull, and an upper portion of each fuel tank is located in the superstructure. Preferably, decks are provided in both hull and superstructure.

Preferably, the tank sub-arrangements are located adjacent said passageways. This can further contribute to keeping the distance from the fuel tanks to the vessel sides relatively large, such as for the safety margin, required by the gaseous fuel hazard, to not be compromised.

Preferably, the tank sub-arrangements are located in respective tank compartments, each extending to a respective side of the vessel. Preferably, each tank compartment extends from said passageways to the respective side of the vessel.

Preferably, the distance between any of the at least one fuel tank of each tank sub-arrangement and a respective side of the vessel is at least 20% of the beam of the vessel.

Thereby, an advantageous distance is provided from the fuel tanks to the vessel sides for the safety margin, required by the gaseous fuel hazard, to not be compromised, while at the same time the passageway, extending between the tank sub-arrangements is not infringed upon, so that movement of persons and items in the longitudinal direction of the vessel is facilitated.

The vessel may comprise two exhaust guiding arrangements provided for guiding exhaust gases from the at least one power providing apparatus to the exterior of the vessel, each exhaust guiding arrangement being located in a respective exhaust pipe casing. It should be noted that in case there is more than one power providing apparatus, e.g. two of them, each exhaust guiding arrangement may be adapted to guide exhaust gases from a respective of the power providing apparatuses to the exterior of the vessel. The power providing apparatus(-es) might be located in one or more engine rooms, and the exhaust pipe casings might extend from the engine room, or a respective of the engine rooms, to the exterior of the vessel.

Preferably, the exhaust pipe casings extend vertically past at least two of the decks past which the fuel tanks extend. Preferably, the exhaust pipe casings are distributed on opposite sides of said passageways. Preferably, the exhaust pipe casings extend adjacent to said passageways.

In some embodiments, the tank sub-arrangements are located, in the longitudinal direction of the vessel, between the exhaust pipe casings and the bow. Thereby, the tank sub-arrangements could be located, in the longitudinal direction of the vessel, at a distance from the exhaust pipe casings. In other embodiments, the tank sub-arrangements could be located, in the longitudinal direction of the vessel, between the exhaust pipe casings and the stern, at a distance from the exhaust pipe casings.

In some embodiments, each tank sub-arrangement is located adjacent a respective of the exhaust pipe casings. Thereby, each tank sub-arrangement could be longitudinally aligned with the respective exhaust pipe casing. Locating each tank sub-arrangement adjacent a respective of the exhaust pipe casings provides for combining vertical zones in which the tank sub-arrangements and the exhaust pipe casings extend. This in turn simplifies the design of the vessel, and provides for its fabrication to be simpler and more cost effective.

Preferably, the exhaust pipe casings are distributed at a distance from each other in the longitudinal direction of the vessel, and the tank sub-arrangements are located, in the longitudinal direction of the vessel, between the exhaust pipe casings. Thereby, the exhaust pipe casings could be, similarly to the tank sub-arrangements, distributed on opposite sides of said passageways, whereby the tank sub-arrangements could be at the same longitudinal position in the vessel, and one of the exhaust pipe casings could be located forward of the respective tank sub-arrangement, and the other exhaust pipe casing could be located aft of the respective tank sub-arrangement.

DESCRIPTION OF THE DRAWINGS

Below embodiments of the invention will be described with reference to the drawings in which, FIG. 1 shows a cross-sectional side view of a cruise ship, with the section being vertical and coinciding with a centreline of the ship, FIG. 2 shows a cross-sectional top view of the ship in FIG. 1, with the section located as indicated by the arrows II-II in FIG. 1, FIG. 3 shows a cross-sectional side view of a cruise ship according to an alternative embodiment of the invention, and FIG. 4 shows a cross-sectional top view of the ship in FIG. 3, with the section located as indicated by the arrows IV-IV in FIG. 3.

DETAILED DESCRIPTION

FIG. 1 shows a marine surface vessel in the form of a passenger ship, more particularly a cruise ship 1. The ship 1 extends in a longitudinal direction between a bow 2 and a stern 3 of the ship 1. The ship presents a hull 4 and a superstructure 5 above the hull 4. The ship 1 has two power providing apparatuses in the form of internal combustion engines 6. The engines 6 are operatively connected to a respective propulsion unit 7 for propulsion of the ship 1. The propulsion units 7 are here provided as azipull thrusters, but they can of course be provided in any suitable form, e.g. as some other type of pod propulsion units, as propeller and rudder combinations, or as water jets.

The ship 1 comprises a fuel tank arrangement 8 for storing gaseous fuel in a liquid phase, in this example LNG (liquid natural gas). The fuel tank arrangement 8 connected to the engines 6 by means of a gas supply system for running the engine 6. The gas supply system (not shown) comprises piping and an evaporator device for evaporating the liquid fuel to gas and warming it up.

The ship presents eight decks 91-98 distributed vertically, one above the other. The three lowest decks 91-93 are located in the hull 4 and the five decks above 94-98 are located in the superstructure 5.

As can be seen in FIG. 2, the fuel tank arrangement 8 comprises two tank sub-arrangements 81, 82. Each tank sub-arrangement 81, 82 comprises two gaseous fuel tanks 811, 812, 821, 822. Each fuel tank 811, 812, 821, 822 is a vertically oriented pressure vessel, with temperature insulation for storing LNG, presenting the shape of a vertical tube with a circular horizontal cross-section.

The fuel tanks 811, 812, 821, 822 of each tank sub-arrangement 81, 82 are distributed in the longitudinal direction of the ship 1. The tank sub-arrangements 81, 82 are at the same longitudinal position in the ship 1. Each tank sub-arrangement 81, 82 has a vertically elongated shape.

As can be seen in FIG. 1, the fuel tanks 811, 812, 821, 822, (two of which are depicted in FIG. 1 with broken lines), each extend vertically past four of the decks 92-95. Thus, the lower ends of the fuel tanks 811, 812, 821, 822 are at the level of the bottom deck 91, and the top ends of the fuel tanks 811, 812, 821, 822 are at the level of the sixth deck 96. Thus, a lower portion of each fuel tank 811, 812, 821, 822 is located in the hull 4, and an upper portion of each fuel tank 811, 812, 821, 822 is located in the superstructure 5.

Reference is made to FIG. 2. Each of the four decks 92-95, past which the fuel tanks 811, 812, 821, 822 extend, presents a passageway extending between the tank sub-arrangements 81, 82. The passageway 941 of the fourth deck 94 is indicated in FIG. 2. The passageway 941 extends in the longitudinal direction of the ship 1, from a portion 942 of the fourth deck 94 aft of the tank sub-arrangements 81, 82 to a portion of the fourth deck 943 forward of the tank sub-arrangements 81, 82. The passageway 941 is located centrally in a lateral and horizontal direction of the ship 1, and the tank sub-arrangements 81, 82 are located adjacent the passageway 941.

The passageway 941 is provided as a corridor between the tank sub-arrangements 81, 82, and is of a width and height which makes it suitable for movement of persons, e.g. crew or passengers, and items, e.g. luggage, food, interior details, supplies or equipment, through the passageway 941.

The passageways on the second, third and fifth deck 92, 93, 95 are also arranged as described above regarding the passageway 941 on the fourth deck 94.

As can be seen in FIG. 2, the tank sub-arrangements 81, 82 are located in respective tank compartments 83, 84, each extending from the passageway 941 to the respective side 101, 102 of the ship.

A plurality of the decks each presents a plurality of cabins 944, 945 distributed on both sides of the passageway 941. The cabins 944, 945 each extend from the passageway 941 to a respective side 101, 102 of the ship. Three of the cabins 944, 945 shown in FIG. 2 are located adjacent to a respective tank compartment 83, 84. Two 945 of these cabins extend from the passageway 941 towards the respective side 101, 102 of the ship, and into a respective space between the respective tank sub-arrangement 83 84 and the respective side 83, 84 of the ship. Thus, the spaces between the tank sub-arrangements 81, 82 and the respective side 101, 102 of the ship are used partly for cabins.

As can be seen in FIG. 1, a venting tube 85 extends upwards from the top of the ship 1. The venting tube communicates with the tank compartments 83, 84 for ventilation of the latter.

The distance between any of the fuel tanks 811, 812, 821, 822 a respective side 101, 102 of the ship 1 is no less than 20% of the beam of the ship.

The ship 1 has two exhaust guiding arrangements 21, 22 for guiding exhaust gases from a respective of the engine 6 to the exterior of the ship via respective exhaust stacks 23, 24 at the top of it. The exhaust guiding arrangements 21, 22 are embodied as exhaust pipes 21, 22, indicated in FIG. 1 with broken lines. Each exhaust pipe 21, 22 is located in a respective exhaust pipe casing 25, 26. The engines 6 are located in respective engine rooms 61, and the exhaust pipe casings 25, 26 extend from the respective engine room 61 to the exhaust stacks 23, 24.

In this embodiment, the tank sub-arrangements 81, 82 are located, in the longitudinal direction of the ship 1, between exhaust pipe casings 25, 26 and the bow 2. The distance, in the longitudinal direction of the ship 1, between the tank sub-arrangements 81, 82, and the exhaust pipe casings 25, 26 is in this example about 17% of the ship's length.

FIG. 3 and FIG. 4 show an alternative embodiment of the invention. In this embodiment, each tank sub-arrangement 81 82 is located adjacent a respective of the exhaust pipe casings 25, 26, and each tank sub-arrangement 81 82 is longitudinally aligned with the respective exhaust pipe casing 25, 26.

The exhaust pipe casings 25, 26 extend vertically past six decks 93-98, the lower three 93-95 of which the fuel tanks 811, 812, 821, 822 extend past as well. The exhaust pipe casings 25, 26 are distributed on opposite sides of passageways 941 of the decks 93-98 which they extend past, and they extend adjacent to these passageways 941.

The exhaust pipe casings 25, 26 are distributed at a distance from each other in the longitudinal direction of the ship 1. The tank sub-arrangements 81, 82 are located, in the longitudinal direction of the ship 1, between the exhaust pipe casings 25, 26. The tank sub-arrangements 81, 82 are at the same longitudinal position in the ship 1, and one of the exhaust pipe casings 25 is located forward of the respective tank sub-arrangement 81, and the other exhaust pipe casing 26 is located aft of the respective tank sub-arrangement 82.

As understood, embodiments of the invention provides for saving deck space in the ship 1, and facilitating on-board functions, while keeping gaseous fuel storage safety margins. It should be added that embodiments of the invention can also provide, by the vertical fuel tank orientation, a relatively low formation of boil-off gas in the fuel tanks 811, 812, 821, 822, and the possibility of lifting tanks upwards for replacement.

The invention claimed is:

1. A marine passenger vessel extending in a longitudinal direction between a bow and a stern, comprising:
    least one power providing apparatus operatively connected to at least one propulsion unit for propulsion of the vessel,
    a fuel tank arrangement for storing gaseous fuel in a liquid phase, connected to the power providing apparatus by means of a gas supply system for running the power providing apparatus, and
    a plurality of decks distributed vertically, one above the other, the fuel tank arrangement comprising two tank sub-arrangements, each tank sub-arrangement comprising at least one gaseous fuel tank, each fuel tank extending vertically past at least two of the decks, and
    at least two of the decks, past which the fuel tanks extend, each presenting a passageway,
    wherein each of said passageways extends in the longitudinal direction of the vessel, from a portion of the respective deck aft of the tank sub-arrangements to a portion of the respective deck forward of the tank sub-arrangements,
    wherein each passageway extends between the tank sub-arrangements, there being one, two, three or more tank sub-arrangements on each side of the passageways,
    wherein each of said passageways is adapted so as to provide for persons and/or items to move or be moved through the respective passageway, the passageway being provided as a corridor between the tank sub-arrangements, and being of a width and height which makes it suitable for movement of passengers through the passageway.

2. The vessel according to claim 1, wherein each of said passageways extends in the longitudinal direction of the vessel, and is located centrally in a lateral and horizontal direction of the vessel.

3. The vessel according to claim 1, wherein at least one of the at least two the decks presenting a passageway extending between the tank sub-arrangements, presents a plurality of cabins distributed on both sides of the passageway, at least some of the cabins extending from the passageway to a respective side of the vessel.

4. The vessel according to claim 1, wherein each tank sub-arrangement comprises at least two fuel tanks distributed in the longitudinal direction of the vessel.

5. The vessel according to claim 1, wherein the tank sub-arrangements are at the same longitudinal position in the vessel.

6. The vessel according to claim 1, wherein each tank sub-arrangement has a vertical extension which is larger than any of its horizontal extensions.

7. The vessel according to claim 1, presenting a hull and a superstructure above the hull, wherein a lower portion of each fuel tank is located in the hull, and an upper portion of each fuel tank is located in the superstructure.

8. The vessel according to claim 1, wherein the tank sub-arrangements are located adjacent said passageways.

9. The vessel according to claim 1, wherein the tank sub-arrangements are located in respective tank compartments, each extending to a respective side of the vessel.

10. The vessel according to claim 1, wherein the distance between any of the at least one fuel tank of each tank sub-arrangement and a respective side of the vessel is at least 20% of the beam of the vessel.

11. The vessel according to claim 1, comprising two exhaust guiding arrangements provided for guiding exhaust gases from the at least one power providing apparatus to the exterior of the vessel, each exhaust guiding arrangement being located in a respective exhaust pipe casing.

12. The vessel according to claim 11, wherein the exhaust pipe casings extend vertically past at least two of the decks past which the fuel tanks extend.

13. The vessel according to claim 11, wherein the exhaust pipe casings are distributed on opposite sides of said passageways.

14. The vessel according to claim 11, wherein the exhaust pipe casings extend adjacent to said passageways.

15. The vessel according to claim 11, wherein each tank sub-arrangement is located adjacent a respective of the exhaust pipe casings.

16. The vessel according to claim 11, wherein the tank sub-arrangements are located, in the longitudinal direction of the vessel, between the exhaust pipe casings and the bow.

17. The vessel according to claim 11, wherein the exhaust pipe casings are distributed at a distance from each other in the longitudinal direction of the vessel, and the tank sub-arrangements are located, in the longitudinal direction of the vessel, between the exhaust pipe casings.

* * * * *